United States Patent
Nucci et al.

(10) Patent No.: US 7,712,134 B1
(45) Date of Patent: May 4, 2010

(54) METHOD AND APPARATUS FOR WORM DETECTION AND CONTAINMENT IN THE INTERNET CORE

(75) Inventors: Antonio Nucci, Burlingame, CA (US); Supranamaya Ranjan, Palo Alto, CA (US)

(73) Assignee: Narus, Inc., Sunnyvale, CA (US)

( * ) Notice: Subject to any disclaimer, the term of this patent is extended or adjusted under 35 U.S.C. 154(b) by 936 days.

(21) Appl. No.: 11/326,928

(22) Filed: Jan. 6, 2006

(51) Int. Cl.
*H04L 9/00* (2006.01)

(52) U.S. Cl. .................. 726/23; 713/172; 713/188; 726/25

(58) Field of Classification Search .......... 713/172, 713/188, 200; 726/25, 23
See application file for complete search history.

(56) References Cited

U.S. PATENT DOCUMENTS

| | | | |
|---|---|---|---|
| 6,304,639 B1 * | 10/2001 | Malomsoky et al. ... | 379/112.04 |
| 6,981,146 B1 * | 12/2005 | Sheymov ................ | 713/172 |
| 2004/0158725 A1 * | 8/2004 | Szor ....................... | 713/188 |
| 2005/0044406 A1 * | 2/2005 | Stute ...................... | 713/201 |
| 2005/0086512 A1 * | 4/2005 | Lee et al. ............... | 713/200 |
| 2006/0095970 A1 * | 5/2006 | Rajagopal et al. ...... | 726/25 |

OTHER PUBLICATIONS

Christoph Goldi/Roman Hiestand, Scan Detection Based Identification of Worm-Infected Hosts, Apr. 18, 2005.*

Arno Wagner/Bernhard Plattner, Entropy Based Worm and Anomaly Detection in Fast IP Networks, Jan. 1, 2003.*

Anukool Lakhina/Mark Crovella/Christophe Diot, Mining Anomalies Using Traffic Feature Distributions, Aug. 21, 2005.*

Yin Zhang, Matthew Roughan, Cartsen Lund, David Donoho, An Information—Theoretic Approach to Traffic Matrix Estimation, Aug. 25, 2003. "http://www-stat.stanford.edu/~donoho/Reports/2003/ITATME"; 12 pages.*

Wang Hong, Gong Zhenhu, Lu Zexin, Su Jinshu, Li Sudan, An Entropy Based Algorithm to Find Critical Traffic Matrices, 2008, "http://ieeexplore.ieee.org/stamp/stamp.jsp?arnumber=04498194"; 6 Pages.*

Liu Yong, Don Towsley, Ye Tao, Bolot Jean, An Information-theoretic Approach to Network Monitoring and Measurement, 2005, http://www.imconf.net/imc-2005/papers/imc05efiles/liu_yong/liu_yong.pdf; 14 pages.*

Wehner, S., "Analyzing Worms and Network Traffic Using Compression," Journal of Computer Security, vol. 15, No. 3 (Aug. 2007), pp. 303-320.

Lakhina, A., et al., "Mining Anomalies Using Traffic Feature Distributions," in: Proceedings of the 2005 Conference on Applications, Technologies, Architectures, and Protocols for Computer Communications (Aug. 22-26, 2005), pp. 217-228.

Wagner, A., and Plattner, B., "Entropy Based Worm and Anomaly Detection in Fast IP Networks," in: Proceedings of the IEEE 14th International Workshop on Enabling Technologies: Infrastructures for Collaborative Enterprises (WET ICE) (Jun. 13-15, 2005), pp. 172-177.

* cited by examiner

*Primary Examiner*—Carl Colin
*Assistant Examiner*—Michael Anderson
(74) *Attorney, Agent, or Firm*—Fernandez & Associates, LLP

(57) ABSTRACT

A method and an apparatus is provided that is efficient in detecting network virus and worms while using only the layer-4 information that is easily extracted from core routers and also be scalable when layer-7 information is available. Entropy analysis is used to identify anomalous activity at the flow level. Thereafter, only the contents of suspicious flows are analyzed with fingerprinting extraction. By doing so, the present invention brings together the characteristics of being deployable for real-time high data to rate links and the efficiency and reliability of content fingerprinting techniques.

20 Claims, 7 Drawing Sheets

LCS-F:(A,m,B,n)

for $i := 0$ to $m$ do $L(i,0) := 0$, $s(i,0) := \{\}$
for $j := 0$ to $n$ do $L(0,j) := 0$, $s(0,j) := \{\}$
for $i := 1$ to $m$ do
    for $j := 1$ to $n$ do
    if $A[i] = B[j]$ then
        $L(i,j) := 1 + L(i-1,j-1)$
        $s(i,j) := s(i-1,j-1) \cup A[i]$
    else
        $L(i,j) := \max(L(i-1,j), L(i,j-1))$
        if $L(i,j) = L(i-1,j)$ then
            $s(i,j) := s(i-1,j)$
        else
            $s(i,j) := s(i,j-1)$
$\text{len} := L(m,n)$, $\text{lcs} := s(m,n)$

Figure 2

METHOD AND APPARATUS FOR WORM DETECTION AND CONTAINMENT IN THE INTERNET CORE

BACKGROUND

1. Field

The present invention relates to computers and computer networks. More particularly, the present invention relates to method and apparatus for worm detection and containment in the Internet Core.

2. Description of Related Art

Recent years have seen a sharp increase in Internet worms causing damage to millions of systems worldwide. Worms are automated programs that exploit vulnerabilities in computers connected to the network in order to gain control over them. Once they have successfully infected a system, they continue to search for new victims and can spread through the network on their own. Worse, each new epidemic has demonstrated increased speed, virulence or sophistication over its predecessor. While the Code Red worm took over fourteen hours to infect its vulnerable population in 2001, the Slammer worm, released some 18 months later, did the same in less than 10 minutes. More details can be found in D. Moore, V. Paxon, S. Savage, C. Shannon, S. Staniford, and N. Weaver "The Spread of the Sapphire/Slammer Worm", IEEE Security and Privacy, 1(4), July 2003, and D. Moore, C. Shannon, and J. Brown "A Case Study on the Spread and Victims of an Internet Worm", Proceeding of the ACM Internet Measurement Workshop, November 2002. The Code Red worm is thought to have infected roughly 360,000 hosts, while by some estimates, the Nimda worm compromised over two million. More details can be found in M. Erbschloe, Computer Economics VP Research Statement to Reuters News Service, November 2001. Unfortunately, current ability in 2005 to defend against these outbreaks is extremely poor and has not advanced significantly since the Code Red episode in mid-2001. In fact, the basic approach of detection, characterization and containment has not changed significantly over the last five years.

Typically, a new worm is detected in an ad-hoc fashion and its signature extracted to update the anti-virus and network filtering products. While such approaches are qualitatively sound, they are not quantitatively efficient. Manual signature extraction is an expensive procedure that takes hours or even days to complete. It requires isolating a new worm, decompiling it, looking for invariant code sequences and testing for signature uniqueness. However, recent simulations by Moore et al. suggest that to be effective, worm containment must react within sixty seconds. More details can be found in D. Moore, C. Shannon, G. Voelker, and S. Savage "Internet Quarantine: Requirements for Containing Self-Propagating Code," Proceedings of the Infocom, April 2003.

With worms becoming ever complex and numerous, enterprise networks have been increasingly offloading the responsibility for worm detection and containment to the carrier networks. Enterprise networks are becoming more open and hence vulnerable to attacks as laptops and other portable interne devices traverse traditional perimeter defenses, traveling from place to place and network to network. Additionally, with mandated government regulations, customer privacy concerns and a lack of security knowledge within their IT departments, enterprise customers find securing their networks quite a daunting task. Thus, as enterprise customers realize that their traditional point solutions and perimeter defenses are becoming inadequate, they are shifting their security burden to carriers where it is more efficient and cost-effective.

The potential revenue opportunity for carriers to providing worm containment at the Internet core is huge, since it serves as an important brand differentiator to their services. Moreover, effective worm containment at the carrier to enterprise perimeter frees up resources that the carrier could use instead for carrying traffic for the plethora of bandwidth intensive applications such as multimedia that are in vogue. However, most worm detection algorithms designed so far have catered to the lower rate (100 Mbps to 1 Gbps) enterprise networks, solutions that are not scalable to the high data rate links which characterize the carrier networks (OC-12 up to OC-192).

It is well known that inspecting layer-7 content per packet to extract worm signatures is computation as well as memory intensive and hence, not scalable to the high data rate links such as those at the peering links across carriers. As a consequence, schemes proposed to work in the context of network carrier must consider this critical limitation. Moreover, it is not realistic to assume a carrier will have layer-7 visibility widely deployed through their entire network; usually the carrier will award this capability to only a few customers who pay for the specific service.

The various methods that have been proposed to identify new worms are divided into two major classes. The first class is based on content fingerprinting using layer-7 information. More details can be found in S. Singh, C. Estan, G. Varghese, and S. Savage "Automated Worm Fingerprinting," Proceedings of the 6th ACM/USENIX Symposium on Operating System Design and Implementation (OSDI), December 2004, H. A. Kim and B. Karp, "Autograph: toward automated, distributed worm signature detection," Proceedings of the 13th USENIX Symposium, August 2004, J. Newsome, B. Karp, and D. Song, "Polygraph: Automatically Generating Signatures for Polymorphic Worms,", Proceedings of IEEE Security and Privacy Symposium, Oakland, Calif. USA, May 2005, and V. Karamcheti, D. Geiger, and Z. Kedem "Detecting Malicious Network Traffic using Inverse Distributions of Packet Contents", ACM Sigcomm Workshop on Mining Network Data (MiNet), August 2005. The primary intuition underlying this class is that an ongoing worm propagation should manifest itself in the presence of higher than expected byte-level similarity among network packets: the similarity arises because of the unchanging portions of the worm packet payload, something expected to be present even in polymorphic or obfuscated worms (albeit spread out over the length of the packet). In particular, Earlybird tries to efficiently collect fingerprints of fixed size payload blocks from all the traffic crossing the network border and then checks the address dispersion for the content, reporting a worm when this dispersion is above a fixed threshold. More details can be found in S. Singh, C. Estan, G. Varghese, and S. Savage "Automated Worm Fingerprinting," Proceedings of the 6th ACM/USENIX Symposium on Operating System Design and Implementation (OSDI), December 2004. Opposite approach is used in H. A. Kim and B. Karp, "Autograph: toward automated, distributed worm signature detection," Proceedings of the 13th USENIX Symposium, August 2004, and J. Newsome, B. Karp, and D. Song, "Polygraph: Automatically Generating Signatures for Polymorphic Worms,", Proceedings of IEEE Security and Privacy Symposium, Oakland, Calif. USA, May 2005. A pool of suspicious flows is created, using the number of unanswered inbound SYN packets (hint of a port scanning activity) as a tentative and imperfect indicator of suspect activity and then fingerprinting is applied to short variable length content blocks to identify content prevalence and report possible worms. All these approaches consider packet contents as a bag of substrings of either a fixed length, such as can be found in S. Singh, C. Estan, G. Varghese, and S. Savage "Automated Worm Fingerprinting," Proceedings of the 6th ACM/USENIX Symposium on Operating System Design and Implementation (OSDI), December 2004, or a dynamic packet content-based length, such as can be found in H. A. Kim and B. Karp, "Autograph: toward automated, distributed worm signature detection," Proceedings of the 13th USENIX Symposium, August 2004, and J. Newsome, B. Karp, and D. Song, "Polygraph: Automatically Generating Signatures for Polymorphic Worms,", Proceedings of IEEE Security and Privacy Symposium, Oakland, Calif. USA, May 2005. In V. Karamcheti, D. Geiger, and Z. Kedem "Detecting Malicious Network Traffic using Inverse Distributions of Packet Contents", ACM Sigcomm Workshop on Mining Network Data (MiNet), August 2005, the authors analyze the characteristics of the inverse distribution, I(f), which tracks for a given frequency f, the number of substrings that appear with that frequency and propose I(f) as a new discriminator for an earlier detection of worms. Although the metric used is interesting, the approach must still inspect the payload of all packets passing through the link.

In contrast to the aforementioned class of approaches based on layer-7 packet content analysis, the second class consists of techniques which identify network anomalies by examining the traffic distribution across a few features using layer-4 information. More details can be found in A. Wagner and B. Plattner "Entropy Based Worm and Anomaly Detection in Fast IP Networks", IEEE 14-th International Workshop on Enabling Technologies: Infrastructures for Collaborative Enterprises (WET ICE), STCA security workshop, June 2005, A. Lakhina, M. Crovella, and C. Diot "Mining Anomalies Using Traffic Feature Distributions", ACM Sigcomm, August 2005, K. Xu, Z. Zhang and S. Bhattacharyya "Profiling Internet Backbone Traffic: Behavior Models and Applications", ACM Sigcomm, August 2005, and S. Wehner "Analyzing Worms and Network Traffic using Compression", 2005, cs.CR/0504045. The primary intuition underlying these approaches is that a worm manifestation breaks the statistical characteristics of Internet traffic; worm traffic is more uniform or structured than normal traffic in some respects and more random in others. These approaches propose various techniques based primarily on information-theoretic measures such as Information entropy or Kolgomorov complexity as the statistics to represent the distribution of a traffic feature such as source and destination ip-addresses or port numbers. Thereafter, A. Lakhina, M. Crovella, and C. Diot "Mining Anomalies Using Traffic Feature Distributions", ACM Sigcomm, August 2005 and K. Xu, Z. Zhang and S. Bhattacharyya "Profiling Internet Backbone Traffic: Behavior Models and Applications", ACM Sigcomm, August 2005 propose techniques based on Principle Component Analysis (PCA) and Residual State Analysis (RSA) respectively, to establish complex relationships across the traffic features whereby flows are classified as either legitimate or malicious. However, these prior art approaches such as PCA and RSA, while robust, are primarily offline and hence not effective for worm containment at the high data rate links typical of the Internet core. A. Wagner and B. Plattner "Entropy Based Worm and Anomaly Detection in Fast IP Networks", IEEE 14-th International Workshop on Enabling Technologies Infrastructures for Collaborative Enterprises (WET ICE), STCA security workshop, June 2005 identifies worm activity by detecting major changes in the compressibility characteristics of flow contents using Kolmogorov complexity. This method is also primarily offline and hence not effective for worm containment at the high data rate links typical of the Internet core.

Accordingly, there is a need for a method that is efficient in detecting worms while using only the layer-4 information that is easily extracted from core routers and also be scalable when layer-7 information is available. Further more there is a need for selecting a subset of network traffic data for analysis to bridge the gap between the two classes of approach in the prior art and bring together the characteristics of being deployable for real-time high data rate links and the efficiency and reliability of content fingerprinting techniques.

SUMMARY OF THE INVENTION

The present invention bridges the gap between the two classes of approach in prior art. In contrast to the two classes of prior art approaches, the present invention uses an online algorithm based on the observation that a much simpler relationship between the traffic features can identify worm activity. During worm activity, at least two traffic features are found to exhibit diverging behaviors. The preferred embodiment uses entropy analysis of the traffic to identify anomalous activity at the flow level. It is observed that during a worm break out the entropies of two or more variables will diverge. One embodiment of the present invention uses a marginal entropy ratio as a metric to filter the network traffic data for analysis. An alternative embodiment uses a joint entropy ratio as a metric to filter the network traffic data for analysis. Thereafter, only the content of suspicious flows is analyzed with fingerprinting extraction. By doing so, the present invention brings together the characteristics of being deployable for real-time high data rate links and the efficiency and reliability of content fingerprinting techniques. These two metrics are novel and the use of them enables real time performance and scalability of the present invention. What is important here is the approach of using a single global metric that exhibits sharp change during worm break out to filter network data for real-time analysis. Other suitable metric can be incorporated in alternative embodiments of the present invention instead of the marginal entropy ratio or joint entropy ratio described here. The approach illustrated in the exemplary embodiment of the present invention can be implemented as hardware, firmware, software, or combination thereof, and can be implemented as stand alone device or a computer network wherein the network can be wired or wireless. The exemplary embodiments do not limit the scope of the present invention.

It is a goal of the present invention to provide a novel highly scalable automated worm detection and containment solution from the perspective of a network carrier. It is also a goal of the present invention to provide the capability for worm detection, fingerprint extraction as well as worm propagation to a network carrier. Various embodiments of the present invention may be deployed at: (1) a link to protect a particular enterprise or to monitor traffic sent by another carrier; (2) a router to protect a set of enterprises that use it as the gateway into the carrier or; (3) a set of links and routers to provide a global view into the propagation of the worm across the carrier network as illustrated in FIG. 1.

An exemplary embodiment of the present invention uses an incremental multi-step approach to examine the traffic originating from a network associated with the carrier. In the first step, network traffic is clustered by the subnet from which it originates. In an exemplary embodiment of the present invention, this clustering of the network hosts into clusters is obtained statically as predefined blocks of IP addresses, i.e.

subnets. In another exemplary embodiment of the present invention, this clustering of the network hosts into clusters is obtained dynamically as groups of hosts behaving similarly over time in terms of traffic. Dynamic clustering of hosts can be obtained using various online clustering algorithms to cluster hosts which behave similarly in terms of number of flows generated or other traffic parameters. For instance, a dynamic clustering may be used to identify clusters that correspond to servers and clients of various applications. In the case of a small size network, each host may belong uniquely to its own cluster, in which case, the first step clustering can be eliminated optionally.

Next, a few key traffic features are monitored over these clusters to detect if there is an anomalous activity in any of these clusters, in which case, the cluster responsible for the possible worm outbreak is identified. This is based on the hypothesis that worm traffic is more uniform or structured than normal traffic in some respects and more random in others. An embodiment of the present invention monitors and profiles over time the flow distribution of the following key features for each cluster: i) source IP, ii) source Port, iii) destination IP, iv) destination Port and v) Flow size. During a worm outbreak, these characteristics of the traffic change massively: (i) a large number of flows that originate from only a few infected machines become a significant part of the total traffic monitored; (ii) destination hosts are selected in a pure random fashion leading to a abnormal large number of distinct destination IP contacted in a short time-frame; (iii) source and destination ports are used in an abnormal fashion depending on the scanning strategy used by the worm to identify its potential infected targets e.g., the Blaster worm used a TCP random scanning strategy with fixed destination and variable source port, while the Witty worm used the reverse, a fixed source port and variable destination port; (iv) flows with a similar size become a dominant part of the total flows observed—all fast propagating worms tend to be small in size, in order to spread as fast as possible. This profiling is obtained through either a forecasting or hypothesis testing approach. Each of the two approaches profiles a single metric whose increase reflects a simultaneous divergence in the distribution of at least two key features, characteristic of a worm outbreak.

In the next step, as soon as the metric of a cluster deviates from its normal profile, traffic originating from the suspect cluster is collected on a per-host level to detect anomalous hosts. Next, in an exemplary embodiment where layer-7 information is available, full packet capture of traffic, which satisfy a specific criteria and originate from the suspect hosts, is initiated. Suspicious flows are then compared by looking at the specific content using fast Rabin fingerprinting algorithms. More details can be found in M. O. Rabin, "fingerprinting by Random Polynomials," Tech. Rep. TR-15-81, Center for Research in Computer Technology, Harvard University, 1981. An exemplary embodiment of the present invention acts on and against the self-propagating network worms which use application or protocol bugs to distribute them in a very aggressive way.

Moreover, an exemplary embodiment of the present invention provides the capability to detect complex worm signatures associated to the more evolved and deadly polymorphic worms which are known to change their signature by introducing wild-cards and random characters during their propagation into the network. Based on its capacity to isolate a few suspicious flows, the exemplary embodiment of the present invention uses algorithms such as Longest Common Subsequence Fingerprinting (LCS-F) to extract these signatures in polynomial time. More details can be found in http://www.ics.uci.edu/~dan/class/161/notes/6/Dynamic.html Finally, another exemplary embodiment of the present invention provides a network carrier the unique capability of correlating anomalous activity across space (multiple links or routers in the network) as well as time (multiple time-windows) to provide a global view into the worm propagation across the network. In particular, the exemplary embodiment of the present invention provides the capability to construct a propagation graph per worm per network carrier at different time instances wherein nodes represent the enterprises and carriers that peer with the carrier; directed links representing the direction of worm propagation; weight or color of nodes representing the fraction of the enterprise machines that are considered infected and; and weight or color of links representing the rate of propagation of the worm along the link.

These and other implementations, their variations, applications, and associated advantages and benefits are described in greater detail in the attached drawings, the detailed description, and the claims. This summary does not purport to define the invention. The invention is defined by the claims.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiment of the present invention and are therefore not to be considered limiting of its scope, for the present invention may admit to other equally effective embodiments.

FIG. 2 is a flow chart illustrating the LCS-F-Dynamic which is a polynomial algorithm for solving the Longest Common Subsequence problem.

DETAILED DESCRIPTION OF THE INVENTION

Figure 1:
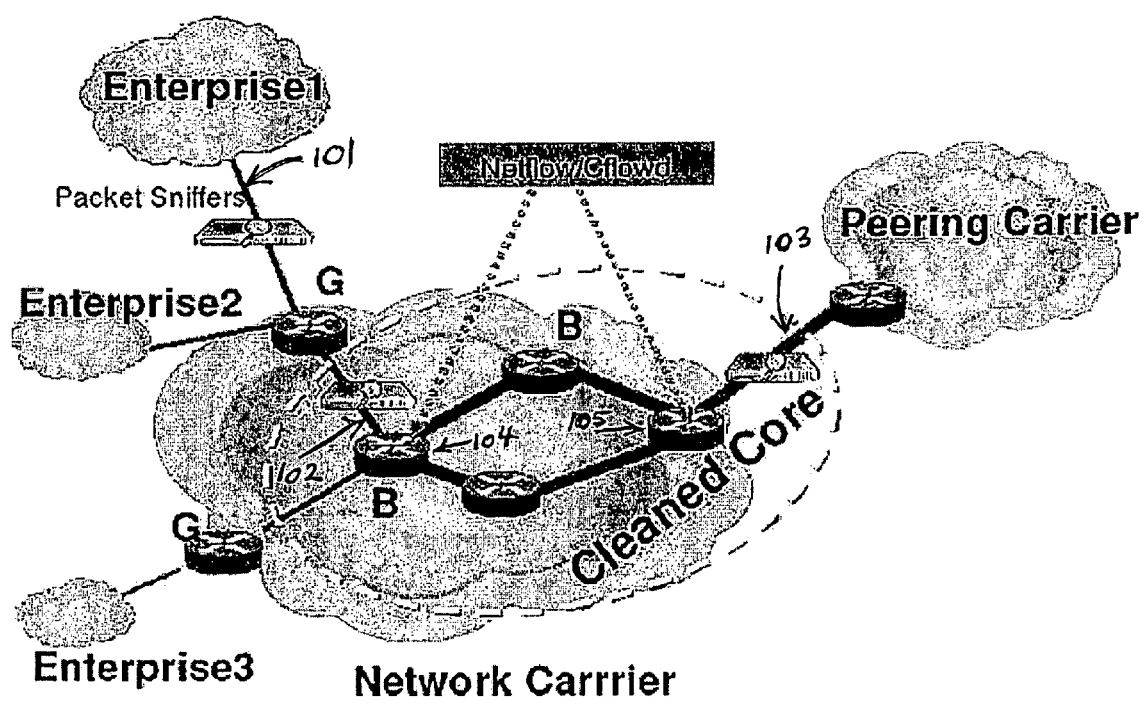
FIG. 1 is a diagram illustrating the system model according to an embodiment of the present invention.

FIG. 1 is a diagram illustrating the system model according to an embodiment of the present invention. Various implementations of the present invention are deployed at the network link level to protect a particular enterprise or across a gateway router to protect a set of enterprises. An exemplary embodiment of the present invention is illustrated as a single network link model. As shown in FIG. 1, in the single network link deployment model, this embodiment of the present invention is deployed either: (1) across the network link 101 that connects an enterprise to the gateway router of the carrier or; (2) across the network link 102 which connects the gateway router to the backbone router thereby protecting a set of enterprises (illustrated as enterprise1 and enterprise2 in FIG. 1) or; (3) across the peering link 103 which connects to another carrier. Each monitored link has a packet sniffer which monitors the packet headers corresponding to all the level-7 flows passing through the link. This embodiment of the present invention achieves the scalability to the high rates characteristic of the peering links by using a two-phase worm identification algorithm wherein packet headers are examined first to statistically infer the existence of a worm and the memory and CPU intensive full packet capture are initiated only thereafter.

Another embodiment of the present invention is illustrated as a router deployment model; this embodiment of the present invention is deployed to obtain periodically the L4 traffic statistics from the gateway or border routers 104 and 105 via the Netflow/Cflowd daemons. This embodiment of the present invention does not have access to the L7 traffic data, and hence in this deployment only the L4 traffic statistics is extracted corresponding to a worm. Thus, due to unavailability of the worm payloads, the existence of a worm is not always predicted accurately, however, this model is cheaper since it does not involve the CPU and memory intensive full packet captures.

Still another embodiment of the present invention is a hybrid deployment model. This embodiment of the present invention is deployed across a set of routers along with at least one network link, thereby offering a trade-off between accuracy in worm detection as well as cost-effectiveness. In this model, the suspicious traffic statistics is cross-correlated across different network elements (routers or links) to infer whether the anomalies are being caused by the same worm. The hybrid deployment is useful in the following scenarios: 1) multiple router and single link scenario, where a sniffer is deployed on the link which has seen intrusions in the past. In such a scenario, the worm signature extracted from the link traffic is propagated to alert the other routers that have seen L4 statistics similar to what was seen on the link; 2) multiple router multiple link scenario, where this embodiment of the present invention is deployed across multiple links and the fingerprints extracted from links with similar L4 statistics are correlated to obtain a suite of fingerprints which identify a class of polymorphic worms.

It is a goal of the present invention is to provide an efficient and scalable detection, fingerprinting and propagation graphing of worms from the point of view of a high-speed network carrier. In order to minimize the amount of information to be processed, the preferred embodiment of the present invention uses three anomaly states: green, yellow and red. Each state indicates a different level of alerts and different action to be taken. The following algorithm is presented for the worm detection; the same algorithm can be used for detecting other anomalies like DoS (Denial of Service) or DDoS (Distributed Denial of Service) as well. This embodiment of the present invention is illustrated with a high-level description of the algorithm.

The algorithm runs in green state during the learning period until no anomaly is detected. During this state, traffic is aggregated per cluster of hosts that might be defined either statically, as predefined blocks of IP addresses, i.e. subnets, or dynamically, as groups of hosts behaving similarly over time in terms of traffic. In the following, the present invention is illustrated using an exemplary embodiment wherein traffic is aggregated per subnet. Each subnet is monitored using an entropy-based approach that considers the evolution over time of the histograms of five key features: i) source-IP, ii) source-Port, iii) destination-IP, iv) destination-Port and v) flow-size. In the general case where each subnet comprises multiple hosts, the "source-IP" histogram captures the number or fraction of flows (y-axis of histogram) for each subnet in the network (x-axis of histogram). The other histograms refer specifically to each subnet profiled; for example, the "destination-IP" histogram of a specific subnet captures the repartition of flows (y-axis) for each destination IP (x-axis) contacted by the subnet. If a cluster collapses to a single host, then the "source-IP" histogram captures the repartition of flows (y-axis) for each host in the network (x-axis), and the other histograms profile the host activity; for example, the "destination-IP" histogram captures the repartition of flows (y-axis) for each destination IP (x-axis) contacted by the host. In order to store less data in memory, this exemplary embodiment of the present invention uses one single global indicator per each subnet that effectively highlights any divergence of at least two of the features corresponding to a potential worm outbreak with minimum delay. The two single global indicators illustrated as examples are: Max-PMER and Max-PJER. What is important here is the approach of extracting single global indicator from one or more key feature of network data. Other key features can be incorporated in alternative embodiments of the present invention. The exemplary embodiment does not limit the scope of the present invention.

The algorithm profiles each subnet independently over time using either a forecasting approach or a hypothesis testing approach. As soon as a subnet deviates from its normal behavior, the cause of the deviation is analyzed to identify which features were involved in the anomaly, i.e. sudden change in their marginal entropies. At this point, the algorithm focuses on the features for which it notices a decrease in their entropy values between the previous and the current time-window, i.e. features whose histograms become unusually concentrated around specific elements. The elements contributing the most to the decrease of the entropy are identified using the concept of relative entropy and important information is extracted and stored, like an abnormal high usage of a specific destination port or a specific flow size; these elements are marked as "suspected" and used to generate a flow-filter to be applied in the next time-window. In this state, depending on the quantity of information collected, the algorithm is able to identify the presence of anomalous traffic but it is not able to fully identify the nature of the threat.

As soon as an anomaly is identified, the subnet is moved into yellow state. During this state, which represents the alert status, information for all the hosts in the suspected subnet is collected. Host behavior is profiled according to the histograms of the same key features as above. Only the flows matching the flow-filter are considered during this analysis. At the end of the current time-window, each host is assigned a score calculated as the number of flows observed times the number of distinct destination IP contacted, i.e. the support of the destination IP histogram for the considered host. Hosts with higher score are marked as "suspected". At this point, if no layer-7 information is available, the presence of the worm is reported together with the list of "suspected" hosts as being infected as well as the "suspected" source/destination port and flow size. This information is stored into a grey list. The number of distinct destination-IPs contacted per time-window and a sample list of them are also reported. If layer-7 information is available, the state of the subnet is moved from yellow to red.

The red state indicates a full alarm status and layer 7 inspection of traffic content from "suspected" hosts is enabled. Each new incoming flow coming from these hosts is passed through the flow-filter and is stored for further analysis only if it matches the filter criteria. In an exemplary embodiment, all packets belonging to the suspect flows are processed and fingerprints are collected from the payload by using one of two fingerprint extraction algorithms: i) Rabin Fingerprints (R-F) and; ii) Longest Common Subsequence Fingerprints (LCS-F). Then complete information is reported. The system moves out from the red state to yellow state as soon as the anomaly status is cleared for the subnet. The subnet is back in green status only if no anomaly is indicated for two consecutive time windows.

Due to its inherent goal to spread widely and quickly, an effective worm must disrupt the distribution of traffic because worm traffic is more uniform or structured than normal traffic in some respects and more random in others. When a fast scanning worm propagates through the Internet, the propagation activity looks like this: a smaller number of hosts try to find other hosts to be infected by attempting to connect to them in a purely random fashion. The change in IP address characteristics seen on a flow level (i.e. when packets belonging to a TCP connection or UDP data stream with the same source/destination IP address and port numbers are reported aggregated into one "flow") is relatively intuitive: infected, scanning hosts try to connect to a lot of other hosts. If these hosts grow to be a significant part of the set of flows seen in total, the source IP addresses of the scanning hosts will be seen in many flows and since they are relatively few hosts, the distribution of the source IP address is more skew around a few hosts infected than under normal traffic conditions. On the other hand, the target IP addresses seen in flows is much more random than in normal traffic. A similar thing happens on the port level. If any attacker scans for a specific vulnerability, these scans often have to go to a specific target destination port. The source ports of these connections are usually selected in some weakly random fashion from a range of possible source ports. If the scanning traffic with these characteristics becomes a significant component of the overall network traffic, the distribution of the destination port in flows seen in the network will be more skewed than under normal conditions. Examples of these behavior are visible in worms appeared in the past, like the Sapphire (destination-Port=1434), CodeRedII (destination-Port=80), Welchia (destination-Port=135) and many others. A few worms, like the Witty worm, behave unexpectedly by using a fixed source port and variable destination port. Independently of the scanning activity, all the above worms are easily identifiable due to the change in the traffic profile they cause. Lately, worms tend to be small in size in order to spread as fast as possible. A large worm size would prolong infection time and consume bandwidth that could be used for infecting other targets. If a specific flow size becomes a significant component of the overall traffic, the distribution of the flow size then becomes more skewed around the flow size used by the worm than under normal conditions. In order to quantify the importance of any abrupt change in the shape of a distribution, the exemplary embodiment of the present invention uses the concept of entropy that measures how random a data set is. The more random it is, the more entropy it contains. Accordingly, the following five key features are extracted over time from data collected for each subnet: <srcIP, srcP, dstIP, dstP, FSize>.

The concept of entropy is mathematically defined as follows. A generic key feature X is monitored over time for a specific subnet A and let $M^X(x)$ be its frequency distribution, i.e. number of times an element x shows up in X. From the frequency distribution $M_i^X(x)=\{x_i\}$ in time window i, the empirical probability distributions $P_i^X(x)$ is derived:

$$P_i^X(x) = \left\{p_i^X \mid p_i^X = \frac{x_i}{m^X}\right\}$$

$m^X = \Sigma x_i$ where is the overall number of flows/packets that contributed to the distribution during time window i. From this probability distribution $P_i^X$, the information entropy $H_i^X$ is calculated as $$H_i^X = -\sum_{p \in P_i^X} p \log_2 p$$

where $0 \log_2 0 = 0$ by convention. As defined, entropy is an indication of the uniformity of the distributions: low entropy indicates high probability in few elements (e.g. concentrated usage of the same port, high traffic from the same source, etc.), while high entropy indicates a more uniform usage (e.g. random scan of destination IP, variable source port, etc.). Since $\log_2(-)$ is used in the definition, each $H_i^X$ assumes values in a range between 0 and $|\log_2(N^X)|$, $N^X$ being the maximum number of distinct values X assumes in the time window. In order to have a metric $H_i^X$ independent of its support size, the Entropy is normalized by the size of its support, i.e. $|\log_2(N^X)|$. This is also known in literature as Relative Uncertainty. In the following Relative Uncertainty is referred to as Entropy.

In the previous section, the concept of i) which key features to monitor per subnet and ii) how to use the entropy to detect a sudden change in their distributions over time are illustrated for the preferred embodiment of the present invention. In order to detect a worm outbreak, the entropy of each of the five features must be profiled over time, leading to a large number of base-lines to track as well a large set of data to store, i.e. five base-lines for each subnet or host need to be monitored. At the same time, it is noticed that during a worm outbreak, the entropies of at least two of the 4 variables diverge. Advantageously the present invention uses a single global metric for each subnet as a function of the five features. The indicator exhibits a stable behavior under normal conditions and exhibits a sharp increase during a worm/scan outbreak as soon as some traffic anomaly alters the entropy pattern of at least two features in the opposite direction. The two global metrics incorporated in the preferred embodiment of the present invention are illustrated as follows.

Maximum Pair-Wise Marginal Entropy Ratio (Max-PMER) is defined as the maximum over all pair-wise key features of the ratio between the marginal entropies (x,y) and its average computed using the last $N_S$ time-windows.

$$R_i = \max_{(x,y) \in K} R_i^{x,y} = \frac{\frac{H_i^x}{H_i^y}}{Avg\left(\frac{H_i^x}{H_i^y}\right)}$$

where i represents the current time-window while $$Avg\left(\frac{H_i^x}{H_i^y}\right) = 1/N_S \sum_{k=i-N_S}^{i-1} \frac{H_k^x}{H_k^y}$$

During normal traffic, the entropies of the five features exhibit a very regular shape as well as their ratio. More specifically, if the marginal entropies exhibit a stationary behavior, their ratio will be stationary as well. If the marginal entropies exhibit a very strong daily cycle, their ratio smoothes out their cycles producing almost a very stable stationary process. Under a worm outbreak, at least two of the five marginal entropies exhibit a divergence in the opposite direction. When this happens, the ratio between the two marginal entropies involved amplifies their divergence. In order to quantify the divergence, the instantaneous ratio is divided by its historical average. The maximum operator considers the largest deviation across all possible pair-wise at each point in time.

Maximum Pair-wise Joint Entropy Ratio (Max-PJER) is defined as the maximum over all pair-wise key features of the ratio between the joint entropies of two variables x and y and the sum of their marginal entropies, and its average computed using the last $N_S$ time-windows.

$$S_i = \max_{(x,y) \in K} S_i^{xy} = \frac{\frac{H_i^{xy}}{H_i^x + H_i^y}}{Avg\left(\frac{H_i^{xy}}{H_i^x + H_i^y}\right)}$$

where i represents the current time-window while $$Avg\left(\frac{H_i^{xy}}{H_i^x + H_i^y}\right) = 1/N_S \sum_{k=i-N_S}^{i-1} \frac{H_k^{xy}}{H_k^x + H_k^y}$$

This metric operates the same way as Max-PMER and is more accurate in capturing the relationship across a pair of features. However, it is more space- and memory-intensive, since we must build joint histograms $H^{xy}$ for each feature-pair besides the marginal histograms.

In the preferred embodiment the anomaly detection consists broadly of two phases: offline base-lining and online detection. First, an offline characterization of traffic from system logs is performed, assuming that the traffic consists of legitimate flows solely, i.e., it is uninfluenced by any worms propagating through the network. Next, in an online phase, the ongoing traffic's statistics is compared with the legitimate profiles obtained previously. In the preferred embodiment, there are two selectable contrasting anomaly detection methods illustrated as follows.

(1) The forecasting method uses a weighted average of traffic statistic in the past few observations as the basis to forecast the statistic for the next time interval and flags the traffic as suspicious if it deviates significantly from the forecast.

(2) The hypothesis testing builds comprehensive distribution profiles of traffic statistics and compares the statistics for ongoing traffic to detect anomalies. The hypothesis testing method differs from the forecasting method in the following: (a) offline analysis phase uses more data to build the profiles; (b) past observations are weighed equally and; (c) time correlation of the statistics i.e., dependency of an observation on the previous observations is not utilized.

In the preferred embodiment if the forecasting method is selected, statistical forecasting algorithms is used to de-noise the data and obtain the trend in a metric and an alarm is raised if the trend exceeds the largest measured deviation observed in the recent past. The Max-PMER metric is used as an example metric to illustrate the algorithm. However, any other metric can be substituted in to the algorithm as well. During a base-lining period, all traffic is supposed to be legitimate to implement the following algorithm:

1. Define an averaging set $\Re_i$ with $|\Re_i|=W$ containing the last W>NS Rj samples considered being in profile. During base-lining all the Rj are considered in profile and included in $\Re_i$. $\Re_i$ is valid only for i>W, so data is collected for at least W time windows before algorithm is executed.

2. Maintain a running average of Ri over $\Re_i$:

$$\overline{R_i} = \frac{1}{W} \sum_{R_n \in \Re_i} R_n$$

During base-lining, since all the last W Ri samples are in $\Re_i$, this becomes:

$$\overline{R_i} = \frac{1}{W} \sum_{n=i-W+1}^{i} R_n$$

3. Define control coefficients $\hat{\alpha}_i^{max}$ and let $\hat{\alpha}_i^{max}=1$ for $0<i<W$.

4. For $W<i \leq T_w$, $T_w$ being the length of the base-lining period: if $R_i > \hat{\alpha}_{i-1}^{max} \overline{R}_{i-1}$ then $$\hat{\alpha}_i^{max} = \frac{R_i}{\overline{R}_{i-1}}$$

else $\hat{\alpha}_i^{max} = \hat{\alpha}_{i-1}^{max}$

At the end of the base-lining period, $\hat{\alpha}_i^{max}$ contains the largest measured excursion between one sample and the average $\overline{R}$ value in the near past. This value is frozen, defining $\alpha^{max} = \hat{\alpha}_{T_w}^{max}$ After the base-lining period, an anomaly is reported whenever $R_i > \alpha^{max} \overline{R}_{i-1}$. If no anomaly is revealed, the sample $R_i$ is added to $\Re_i$, dropping the oldest value in the set, otherwise the sample is discarded, $R_i$ does not change and the average is not updated. The set for the calculation of the running average $\overline{R}$ is therefore detached from the samples coming from the measurements and it will contain only good measures.

The method of flagging traffic as suspicious when the forecast deviates more than expected is efficient, however, it produces unbounded false positives (legitimate traffic flagged as being suspicious), not a desirable feature. In the preferred embodiment if the hypothesis testing method is selected, statistical hypothesis testing is employed which uses a longer base-lining period to build a distribution of the global metric selected G, either Max-PMER or Max-PJER, for legitimate behavior and thereby produces bounded false positives. A comprehensive distribution P(G) is built for the metric G. Anomaly detection is defined as a two-sided null hypothesis test, where given an observed value g for metric G at time window i, the veracity of the statement is tested:

$$g \in P(G)$$

The significance level of the test is set at γ and thus defining two thresholds:

$$\tau_h^{lo} = \left(\frac{\gamma}{2}\right)\% \text{ ile and } \tau_h^{hi} = \left(100 - \frac{\gamma}{2}\right)\% \text{ ile}$$

of the distribution Eh(x).

In other words, an alarm is raised if $g < \tau_h^{lo}$ or $g > \tau_h^{hi}$. Thus, the false positives are bounded by γ. Typical values of γ are 0.1%, 1% or 5%, with higher values indicating more false alarms being raised while also increasing the likelihood of capturing the smallest of deviations from normal behavior. False alarms are expensive in that they lead up to the second stage of the algorithm i.e., full packet capture. A person with ordinary skill of art would recognize that different γ can be chosen as a trade-off between faster detection at higher γ's at the cost of increased processing due to the false alarms.

The flow-filter generation based on Relative Entropy in the preferred embodiment is illustrated as follows. Assume that at a specific point in time I, an anomaly is detected from one of the monitored subnet, according to either the forecasting or the hypothesis testing approach. This condition is alerted if there are at least two of the five marginal entropies that deviate in the opposite direction. Assume X be one of the key features that exhibit a decrease in its entropy value from time-window i−1 to i, i.e. $H_i^X < H_{i-1}^X$. At this point the set $L_{X_i} = \{x_t \in M_i^x(x)\}$ that are contributing the most to the decrease needs to be identified. The cardinality of the set $L_{X_i}$ is defined as an input of the algorithm and it is represented by $|L_{X_i}|$. Given the empirical probability distributions $P_i^X(x)$ and $P_{i-1}^X(x)$, the relative entropy $RE_i^x$ is computed for each of the elements $\{x_t \in M_i^X(x)\}$ as following:

$$RE_i^x = p_i^X \log_2 \frac{p_i^X}{p_{i-1}^X}$$

Then the $\{x_t\}$ is sorted according to their relative entropy value $RE_i^x$ and the largest $|L_{X_i}|$ is selected as the elements of the set $L_{X_i}$.

By applying the above procedure to all key features experiencing a drop in their entropies from i−1 to i, a flow-filter mask is generated that is used in the next time-window when the specific subnet is moved to yellow state and a per host flow information is collected.

During the red state, the exemplary embodiment of the present invention enables the deep packet inspection for specific flows. A few flows originated from suspicious source IPs, source or destination ports and flow size is stored in memory and each packet belonging to these flows is analyzed at the content level. The preferred embodiment of the present invention uses one of the two different algorithms for fingerprinting extraction: i) Rabin Fingerprints (R-F), ii) Longest Common Substring Fingerprints (LCS-F). These algorithms differ in terms of computational complexity and ability to extract more complex worm signatures. A person with ordinary skill in the art would recognize that when speed matters the most, the R-F algorithm is used. As shown in S. Singh, C. Estan, G. Varghese, and S. Savage "Automated Worm Fingerprinting," Proceedings of the 6th ACM/USENIX Symposium on Operating System Design and Implementation (OSDI), December 2004 and H. A. Kim and B. Karp, "Autograph: toward automated, distributed worm signature detection," Proceedings of the 13th USENIX Symposium, August 2004, high speed calculation of fingerprints (or checksums) for the packet payload is a requirement to be able to identify repeating content at line speed. While any hashing algorithm could be used to generate the fingerprint, Rabin fingerprints are among the most used hash functions due to their good hashing properties and the possible incremental implementation that makes them very efficient when calculating successive fingerprints of a sliding window over the data.

The preferred embodiment of the present invention uses a sliding window of 150 bytes over the packet content and stores the number of times each fingerprint is seen in all traffic under investigation. When a fingerprint counter reaches a chosen threshold $T_F$, the flow analyzed is assumed to be a worm due to its high presence in the suspect traffic. A person with ordinary skill in the art would recognize the size of the sliding window can be changed to achieve the best tradeoff between the algorithm efficiency, obtained considering a large window for the fingerprint calculation, and its effectiveness in identifying worms containing small variations in the payload content. These variations are overcome by using smaller windows for the fingerprint calculation, at the cost of the increased computational requirements and false alarms probability. To reduce the probability of false alarms, the fingerprints of legitimate substrings in the traffic, e.g. common protocol headers, are identified and white-listed. White-listing of IP addresses or protocol ports is also possible, when some hosts or services are sources of repetitive legitimate traffic, even if this kind of activity should not have triggered the alarms.

Due to its capability to incrementally narrow down the search and identify the few suspicious flows to be deeply inspected, the preferred embodiment of the present invention provides the ability to detect and extract complex signatures associated to more evolved and deadly worms, also known to those skilled in the art as polymorphic worms. These worms have the characteristics to change their signatures during their propagation into the network, by introducing wild cards or completely random characters. The problem to address for these worms is an old problem also known as longest common sub-sequence between two strings and has been extensively studied in the past. A dynamic programming based LCS-F algorithm (namely LCS-F-Dynamic) is used in various embodiments of the present invention. LCS-F-Dynamic algorithm has polynomial complexity O(mn), where n and m represent the length of the two strings A and B to be compared. More efficient algorithms available in literature that runs in linear time O(n)+O(m) can also be incorporated into the present invention.

A string s is said to be a subsequence of string S, if s can be obtained by deleting 0 or more characters from string S. Thus, a string s is a longest common subsequence of strings S and T, if s is a common subsequence of S and T and there is no other common subsequence of S and T of greater length. For example, if two packet payloads contain the following strings houseboat and computer, the longest common subsequence that LCS-F reports is out. In contrast, since the R-F algorithm looks for the common substring, it will not report any commonality between the two packet payloads. As shown in FIG. 2, the LCS-F-Dynamic algorithm requires as an input the two packet payloads to be compared, i.e. A and B, with their lengths, i.e. m and n. Let s(i,j) be the longest common subsequence of A[1–i] and B[1–j], i.e., the prefixes of the strings A and B of lengths i and j. Also, let L(i,j) be the corresponding length. For each of the m starting points of A, the algorithm checks for the longest common subsequence starting at each of the n starting points of B. Thus, the total number of checks is O(mn). At the end of the algorithm, the longest common subsequence is obtained as s(m,n) with length L(m,n).

In the preferred embodiment, propagation graphing algorithm gives a global to view into the worm propagation across the network. This global view is used for: (1) combination of worm signatures across links in the propagation graph to obtain a family of fingerprints that together identify a class of worms, which is shown as a powerful technique in signature extraction for polymorphic worms and; (2) prediction of the future infection rates for the as yet uninfected network elements depending on the rates of infection observed at other elements. The input to the propagation graphing algorithm is the traffic matrix across the network, using which the algorithm extracts correlations in layer-4 anomalies observed across different network elements. This information is further correlated with events such as: (1) similarity in the suspicious destination port; (2) time correlation in suspicious traffic activity and; (3) rate of growth in probe traffic. Two links in the propagation graph are joined if the anomalous traffic observed is similar e.g., if suspicious probe traffic is observed from enterprise A directed towards B at time t, followed by similar probe traffic from B towards C at time t+δ, then the output is a graph with two directed links A→B and B→C.

Figure 7:
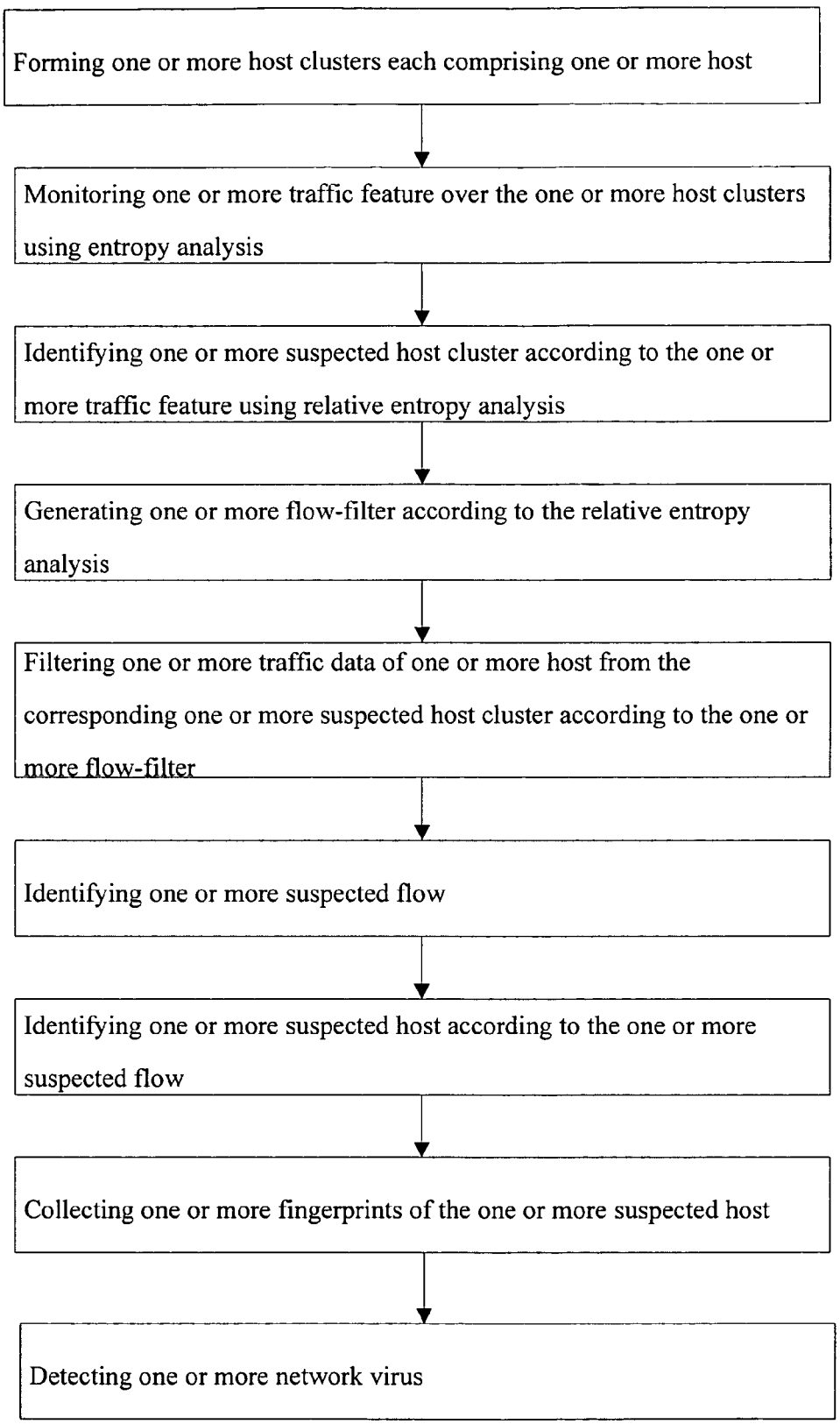
FIG. 7 is a flow chart illustrating the network virus detection method according to an embodiment of the present invention.

FIG. 7 is a flow chart illustrating the network virus detection method according to an embodiment of the present invention. In this exemplary embodiment, a self propagating worm, polymorphic worm, DoS, DDoS, or other network virus is detected in real time by forming one or more host clusters each comprising one or more host; monitoring one or more traffic feature over the one or more host clusters using entropy analysis; identifying one or more suspected host cluster according to the one or more traffic feature using relative entropy analysis; generating one or more flow-filter according to the relative entropy analysis; filtering one or more traffic data of one or more host from the corresponding one or more suspected host cluster according to the one or more flow-filter; identifying one or more suspected flow; identifying one or more suspected host according to the one or more suspected flow; and collecting one or more fingerprints of the one or more suspected host.

In another exemplary embodiment of the present invention, An apparatus detects a self propagating worm, polymorphic worm, DoS, DDoS, or other network virus in real time, the apparatus comprising means for forming one or more host clusters each comprising one or more host; means for monitoring one or more traffic feature over the one or more host clusters using entropy analysis; means for identifying one or more suspected host cluster according to the one or more traffic feature using relative entropy analysis; means for generating one or more flow-filter according to the relative entropy analysis; means for filtering one or more traffic data of one or more host from the corresponding one or more suspected host cluster according to the one or more flow-filter; means for identifying one or more suspected flow; means for identifying one or more suspected host according to the one or more suspected flow; and means for collecting one or more fingerprints of the one or more suspected host.

The preferred embodiment of the present invention has been tested on real traffic traces to test its capabilities. The following results show the performance of the entropy ratio method to identify worm activity. These tests are run with a base-lining period of 200 samples, and the running average is kept with a 60 samples window. The first set of results refers to traffic captured over a few weeks from a Tier 1 network provider and known to contain worm activity. Flow data are collected and aggregated every hour, so the time window duration 'i' for the algorithm is one hour. Due to the low number of hosts in the single subnets, data were analyzed only at network level, i.e. considering only traffic considered being generated inside the network and matching the network 16-bit mask. No payload was available for the flows, so no fingerprinting was possible for this data set.

Figure 3:
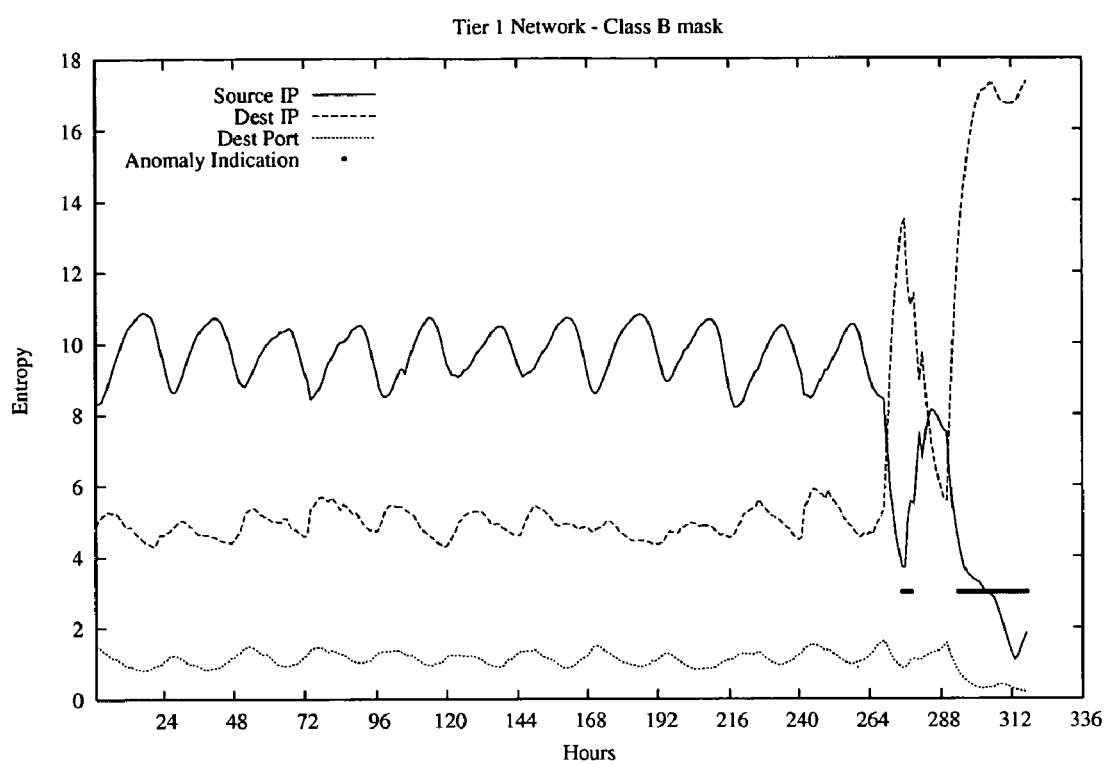
FIG. 3 is a chart illustrating the virus detection and the entropy of source IP address, destination IP address, and destination port distribution for an example TCP traffic according to an embodiment of the present invention.
Figure 4:
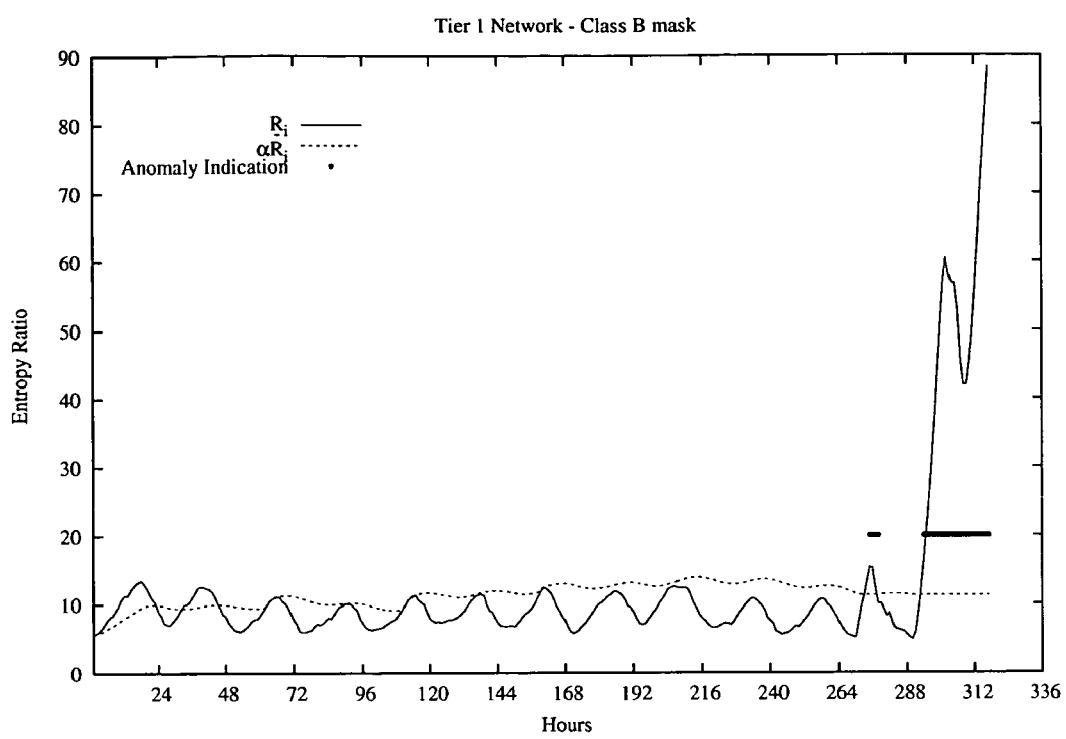
FIG. 4 is a chart illustrating the virus detection and the entropy ratio $R_i$ for the example TCP traffic according to an embodiment of the present invention.

FIG. 3 is a chart illustrating virus detection and the entropy of source IP address, destination IP address, and destination port distribution for an example TCP traffic according to an embodiment of the present invention. In FIGS. 3 and 4 the entropy is not normalized in the plot. FIG. 3 shows the evolution over time of the entropy for the distributions of the 4-tuple elements for TCP traffic and the virus detection alarm raised by this embodiment of the present invention. FIG. 4 is a chart illustrating virus detection and the entropy ratio Ri for the example TCP traffic according to this embodiment of the present invention. The source port distribution is missing since the information about the source port was not collected in the original aggregated flow data so its value had to be ignored in this particular experiment. A clear traffic daily pattern is identified, pattern that is broken when some hosts in the network became infected by the Sasser worm (TCP connection to port 445). The alarms raised by the algorithm of this embodiment of the present invention are shown as small black points: the ordinate value is not relevant, since they are plotted just to show when the algorithm reported an alarm. Two worm waves are clearly identified: a first short one at about Hour 270 and the second one after Hour 291 until the end of the data shown. These waves are much more identifiable when the maximum entropy ratio Ri is considered in FIG. 4. Here the value of Ri is shown, together with the value of $\alpha \overline{R}_i$ as a reference. The base-lining period lasts until Hour 200, so the shape of $\alpha \overline{R}_i$ follows the shape of Ri during this period, especially when Ri>$\alpha \overline{R}_i$, like at Hour 62 or Hour 110. After the end of the base-lining, an alarm is alerted as soon as Ri>$\alpha \overline{R}_i$. During the alarms $\alpha \overline{R}_i$ does not change, since $\alpha$ is constant and $\alpha \overline{R}_i$ is not updated. Due to the fact that most of the legitimate traffic of the network was already directed on TCP port 445, the destination port distribution was not altered in a significant way by the worm, with only a limited decrease.

Figure 5:
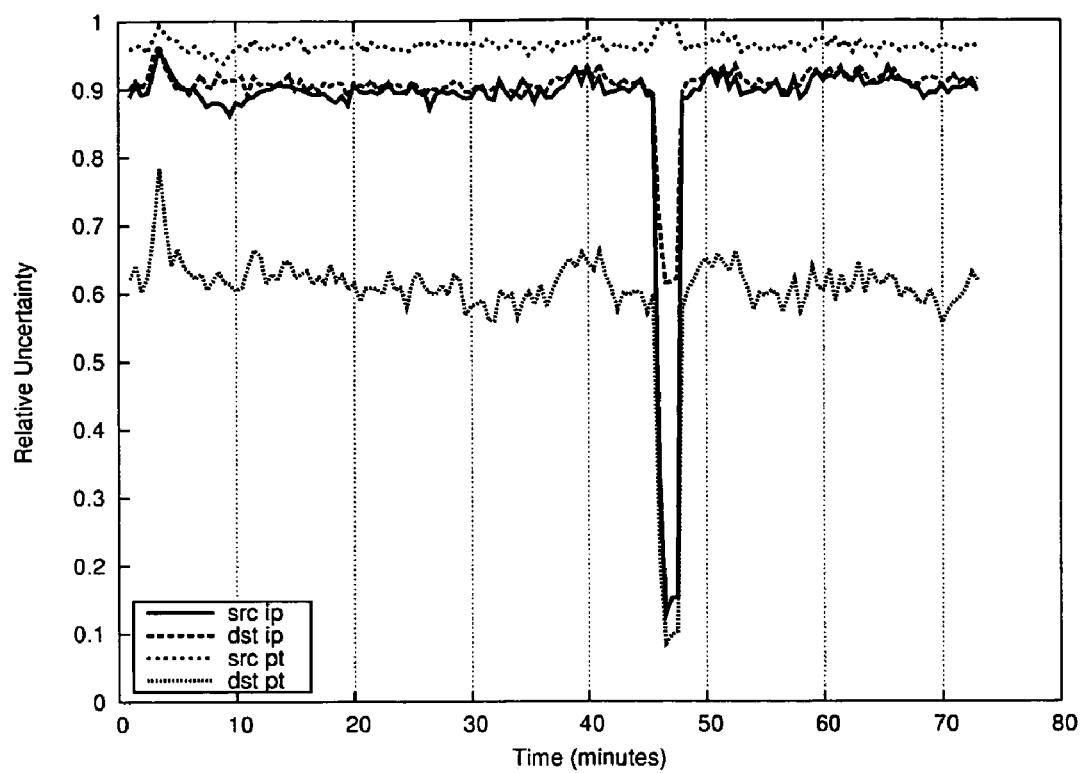
FIG. 5 is a chart illustrating the virus detection and the relative uncertainty of 4-tuple distribution for the example TCP traffic according to an embodiment of the present invention.
Figure 6:
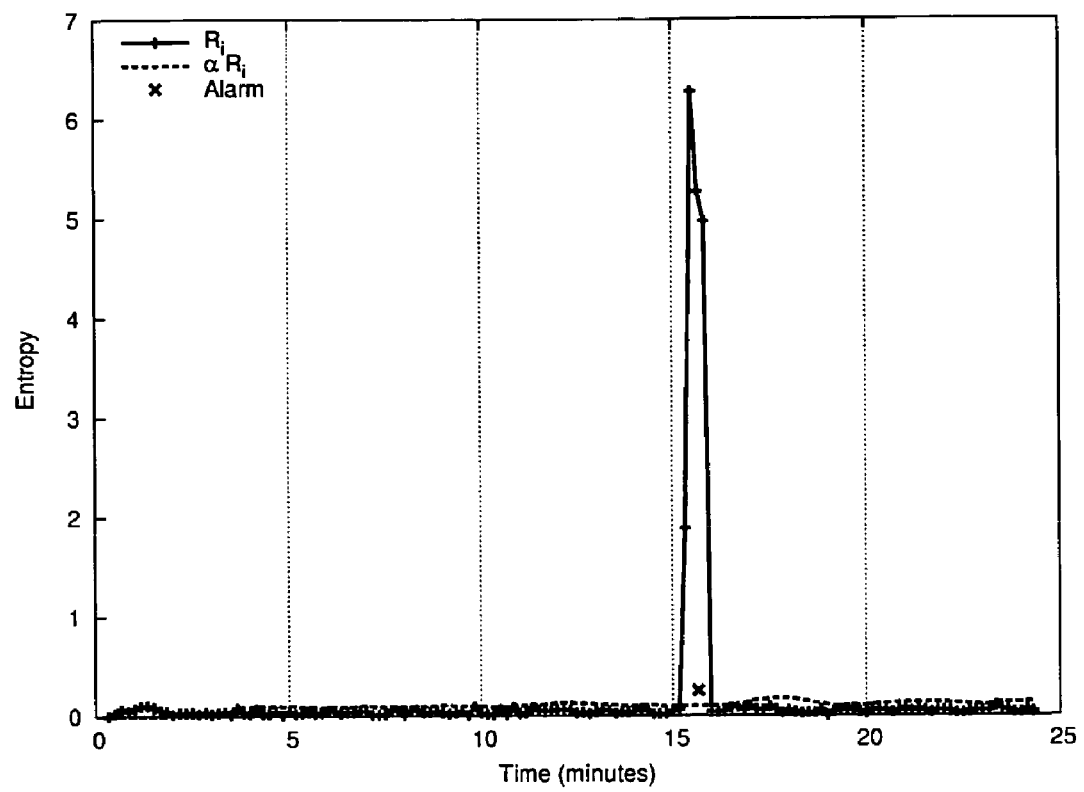
FIG. 6 is a chart illustrating the virus detection and Max-PMER $R_i$ for the example TCP traffic according to an embodiment of the present invention.

FIG. 5 is a chart illustrating the virus detection and relative uncertainty of 4-tuple distribution for the second example TCP traffic according to an embodiment of the present invention. FIG. 6 is a chart illustrating the virus detection and Max-PMER $R_i$ for the second example TCP traffic according to this embodiment of the present invention. In FIGS. 5 and 6 the entropy is normalized in the plot. This second set of results refers to a much different experiment. In this case, a data set of reference traffic offered by a provider is considered in which the traffic of a single host infected by the CodeRed v2 worm was injected. The dataset contains the complete traffic payload. The capture period was rather short, so the time window duration for the algorithm was set to 10 seconds: this means that base-lining lasts for about 33 minutes. In this case all the data from the 4-tuple were available, so also the source port distribution was considered in the algorithm. FIG. 5 and FIG. 6 shows that the CodeRed v2 injection was very short (a few minutes) but is quickly identified by the algorithm of the embodiment of the present invention, especially due to the sharp drop in source IP and destination port entropies. The fingerprint analysis confirms that the host triggering the alarm is actually generating the same traffic toward a high number of destinations. Starting about at minute 42, a fingerprint is identified in the CodeRed v2 request (150 'X' characters, in applying the present invention) for all the failed connection requests and the much more relevant payload fingerprints for the transferred payload when the connections (to port TCP 80, since CodeRed v2 used a vulnerability in Microsoft IIS Web Server) succeed. For example, the 150 byte sequence (non printable characters are represented as . here)

.t . . . h . . . \ . . . P.U . . . \ . . . \CMD.EXE.^ . . . cj . . . d:\inetpub\scripts\root.exe . . . $ . . . \ . . . P.U.j . . . + . . . d:\progra~1\common~1\system\MSADC\root.exe . . . $ is identified in all the flows, sequence that matches the known CodeRed v2 fingerprint.

Thus, a method and an apparatus that is efficient in detecting network virus and worms are disclosed. However, the specific embodiments and methods described herein are merely illustrative. Numerous modifications in form and detail may be made without departing from the scope of the invention as claimed below. The invention is limited only by the scope of the appended claims.

We claim:

1. A method for detecting a virus of a network, comprising the steps of:
   determining a plurality of metrics to represent relative uncertainties of a plurality of traffic features;
   determining, using a computer system and for a time window of a plurality of time windows, a plurality of divergences each representing a difference, within the time window, between a pair of metrics among the plurality of metrics;
   determining, using the computer system, a global metric to represent a maximum one of the plurality of divergences for the time window;
   monitoring, using the computer system and over the plurality of time windows, traffic in the network using the global metric;
   identifying one or more network traffic anomaly in real time when the global metric exceeds a pre-determined threshold;
   analyzing the one or more network traffic anomaly to generate an analysis in real time; and
   determining the network virus based on the analysis in real time,
   wherein the global metric is determined by calculating Max-PMER as a ratio $R_i$ for an $i^{th}$ time window of the plurality of time windows when the traffic of the network is monitored, wherein Max-PMER is calculated according to:

$$R_i = \max_{(x,y) \in K} R_i^{x,y} = \frac{\frac{H_i^x}{H_i^y}}{Avg\left(\frac{H_i^x}{H_i^y}\right)}$$

$$Avg\left(\frac{H_i^x}{H_i^y}\right) = 1/N_S \sum_{k=i-N_S}^{i-1} \frac{H_k^x}{H_k^y}$$

where K represents the plurality of metrics, x and y represent a pair of metrics exhibiting highest divergence in the plurality of metrics within the $i^{th}$ time window, $H_i^x$ and $H_i^y$ represent entropies of x and y, respectively in the $i^{th}$ time window, $H_k^x$ and $H_k^y$ represent entropies of x and y, respectively in the $k^{th}$ time window, and $N_S$ represents a pre-determined number of consecutive time windows prior to the $i^{th}$ time window.

2. The method of claim 1, wherein the plurality of metrics comprise at least one selected from a group consisting of first entropy related to a source IP address of the traffic, second entropy related to a destination IP address of the traffic, third entropy related to a source port of the traffic, fourth entropy related to a destination port of the traffic, and fifth entropy related to a file size of the traffic.

3. The method of claim 1 wherein the identifying one or more network traffic anomaly step comprises the steps of:
   forming one or more host clusters each comprising one or more host of a subnet;
   monitoring the global metric over the one or more host clusters; and
   identifying a suspected host cluster based on the global metric.

4. The method of claim 3 wherein the analyzing one or more network traffic anomaly step comprises the steps of:
   collecting traffic data from the suspected host cluster; and
   identifying a suspected host based on the traffic data.

5. The method of claim 4 wherein the analyzing one or more network traffic anomaly step further comprises the steps of:
   filtering the traffic data to obtain a result using a flow-filter mask generated based on a relative entropy analysis; and
   identifying a suspected flow associated with the suspected host based on the result, whereby virus is determined in real time.

6. The method of claim 5 wherein the determining the network virus step comprises using fingerprint analysis to analyze packet contents of the suspected flow.

7. The method of claim 1 wherein the global metric is used in a hypothesis testing method for identifying the one or more network traffic anomaly.

8. The method of claim 1 wherein the global metric is used in a forecasting method for identifying the one or more network traffic anomaly.

9. The method of claim 1 wherein the determining the network virus step comprises generating a propagation graph.

10. The method of claim 1 wherein the network virus comprises one of self-propagating worm and polymorphic worm.

11. The method of claim 1 wherein the network virus comprises one of Denial of Service attack and Distributed Denial of Service attack.

12. A method for detecting a virus of a network, comprising the steps of:
    determining a plurality of metrics to represent relative uncertainties of a plurality of traffic features;
    determining, using a computer system and for a time window of a plurality of time windows, a plurality of divergences each representing a difference, within the time window, between a pair of metrics among the plurality of metrics;
    determining, using the computer system, a global metric to represent a maximum one of the plurality of divergences for the time window;
    monitoring, using the computer system and over the plurality of time windows, traffic in the network using the global metric;
    identifying one or more network traffic anomaly in real time when the global metric exceeds a pre-determined threshold;

analyzing the one or more network traffic anomaly to generate an analysis in real time; and determining the network virus based on the analysis in real time, wherein the global metric is determined by calculating Max-PJER as a ratio $S_i$ for an $i^{th}$ time window of the plurality of time windows when the traffic of the network is monitored, wherein Max-PJER is calculated according to:

$$S_i = \max_{(x,y) \in K} S_i^{xy} = \frac{\frac{H_i^{xy}}{H_i^x + H_i^y}}{Avg\left(\frac{H_i^{xy}}{H_i^x + H_i^y}\right)}$$

$$Avg\left(\frac{H_i^{xy}}{H_i^x + H_i^y}\right) = 1/N_S \sum_{k=i-N_S}^{i-1} \frac{H_k^{xy}}{H_k^x + H_k^y}$$

where K represents the plurality of metrics, x and y represent a pair of metrics exhibiting highest divergence in the plurality of metrics within the $i^{th}$ time window, $H_i^x$ and $H_i^y$ represent entropies of x and y, respectively in the $i^{th}$ time window, $H_i^{xy}$ represent joint entropy of x and y in the $i^{th}$ time window, $H_k^x$ and $H_k^y$ represent entropies of x and y, respectively in the $k^{th}$ time window, $H_k^{xy}$ represent joint entropy of x and y in the $k^{th}$ time window, and $N_S$ represents a pre-determined number of consecutive time windows prior to the $i^{th}$ time window.

13. An apparatus for network virus detection comprising:

a processor and memory storing instructions when executed by the processor comprising functionalities for:

determining a plurality of metrics to represent relative uncertainties of a plurality of traffic features;

determining, for a time window of a plurality of time windows, a plurality of divergences each representing a difference, within the time window, between a pair of metrics among the plurality of metrics;

determining a global metric to represent a maximum one of the plurality of divergences for the time window;

monitoring network traffic over one or more hosts in the network and over the plurality of time windows using the global metric;

identifying a suspected host from the one or more hosts when the global metric is determined as exceeding a pre-determined threshold, wherein the divergence is represented by a ratio $S_i$ for an $i^{th}$ time window of the plurality of time windows when the traffic of the network is monitored, wherein the ratio $S_i$ is calculated according to:

$$S_i = \max_{(x,y) \in K} S_i^{xy} = \frac{\frac{H_i^{xy}}{H_i^x + H_i^y}}{Avg\left(\frac{H_i^{xy}}{H_i^x + H_i^y}\right)}$$

-continued $$Avg\left(\frac{H_i^{xy}}{H_i^x + H_i^y}\right) = 1/N_S \sum_{k=i-N_S}^{i-1} \frac{H_k^{xy}}{H_k^x + H_k^y}$$

where K represents the plurality of metrics, x and y represent a pair of metrics exhibiting highest divergence in the plurality of metrics within the $i^{th}$ time window, $H_i^x$ and $H_i^y$ represent entropies of x and y, respectively in the $i^{th}$ time window, $H_i^{xy}$ represent joint entropy of x and y in the $i^{th}$ time window, $H_k^x$ and $H_k^y$ represent entropies of x and y, respectively in the $k^{th}$ time window, $H_k^{xy}$ represent joint entropy of x and y in the $k^{th}$ time window, and $N_S$ represents a pre-determined number of consecutive time windows prior to the $i^{th}$ time window;

generating a flow-filter mask based on a relative entropy analysis;

filtering traffic data of the suspected host to obtain a result using the flow-filter mask;

identifying a suspected flow associated with the suspected host based on the result;

collecting one or more fingerprints of the suspected host by analyzing packet contents of the suspected flow; and detecting the network virus in real time based on the one or more fingerprints.

14. The apparatus of claim 13 wherein the plurality of metrics relate to information collected across a network link coupling an enterprise network to a gateway router of a network carrier whereby the enterprise network is protected.

15. The apparatus of claim 13 wherein the plurality of metrics relate to information collected across a network link coupling a gateway router to a backbone router of a network carrier whereby one or more enterprise network connected to the gateway router is protected.

16. The apparatus of claim 13 wherein the plurality of metrics relate to information collected across a peering link coupling a first carrier network to a second carrier network.

17. The apparatus of claim 13 wherein the plurality of metrics relate to information collected from a gateway or border router via Netflow/Cflow Daemon whereby cost is reduced.

18. The apparatus of claim 13 wherein the plurality of metrics relate to information collected across one or more network link and one or more router whereby trade-off between accuracy in virus detection and cost-effectiveness may be achieved.

19. The apparatus of claim 18 further comprising a sniffer deployed on a link whereby a virus signature extracted from the link may be propagated to alert one or more routers.

20. The apparatus of claim 18 wherein a suite of fingerprints is extracted and correlated from a plurality of network links whereby a class of polymorphic worms may be identified.

* * * * *